M. ROBBINS.
Pendulum Scales.
No. 1,942.
Patented Jan'y 23, 1841.
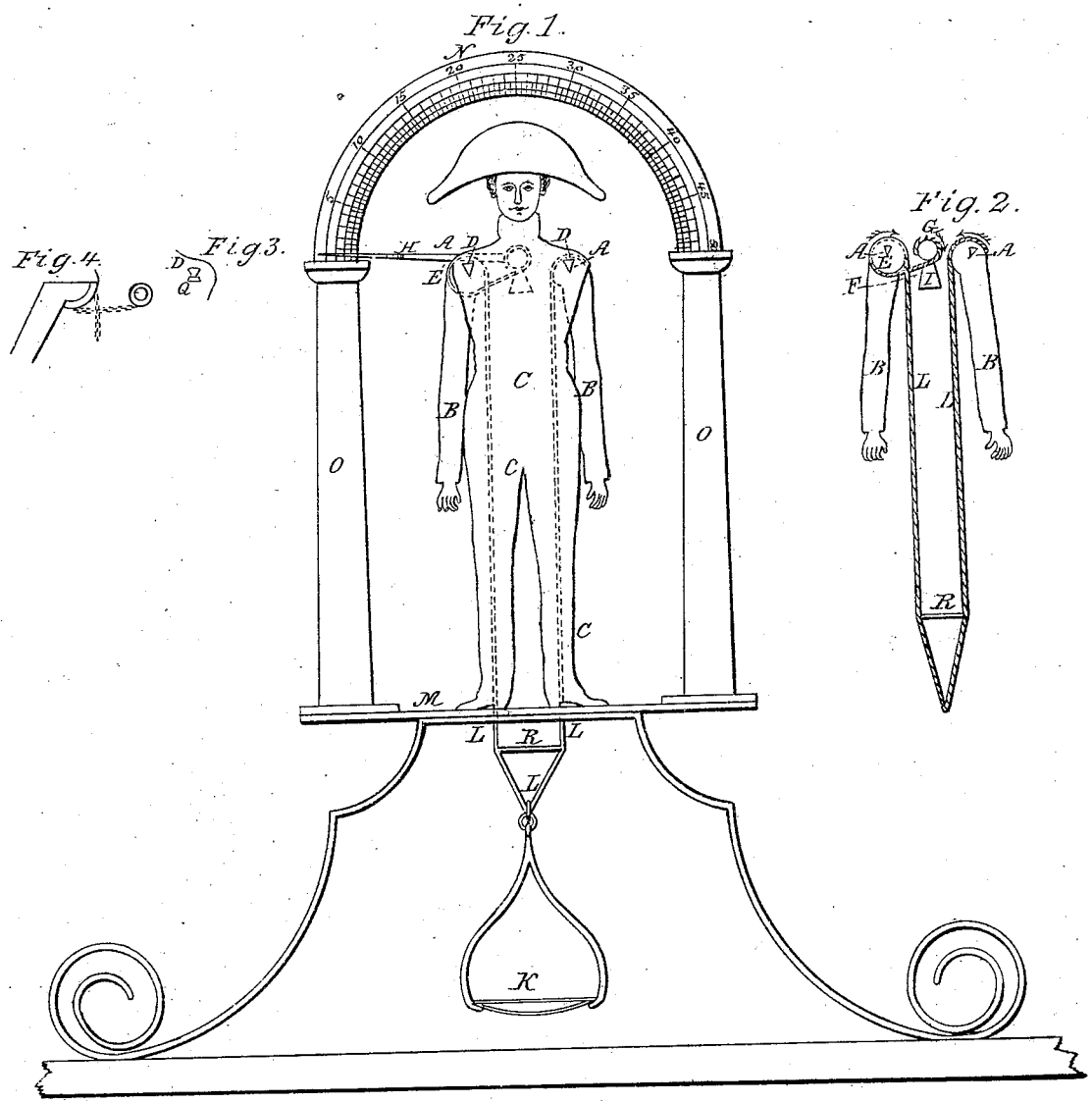

UNITED STATES PATENT OFFICE.

MARTIN ROBBINS, OF HOLLIDAYSBURG, PENNSYLVANIA.

METHOD OF MOVING THE INDEX THROUGH A SEMICIRCLE ON WEIGHING APPARATUS.

Specification of Letters Patent No. 1,942, dated January 23, 1841.

*To all whom it may concern:*

Be it known that I, MARTIN ROBBINS, of Hollidaysburg, in the county of Huntingdon and State of Pennsylvania, have invented a new and useful Improvement in Apparatus for Weighting, called "Robbins' Pendulous Lever-Scales," which is described as follows, reference being had to the annexed drawings of the same, making part of this specification.

Figure 1 is a front view of the apparatus arranged in the form of a human figure standing under an arch. Fig. 2 is a section representing the arms or weighted levers, pulley and pendulum detached from the body of the figure. Fig. 3 is a section representing the openings in the figure and the steel dies at the bottom of the same for the knife edged shafts to turn in. Fig. 4 is a section representing an arm or weighted lever with a quarter pulley.

Similar letters refer to similar parts in the figures.

This weighing apparatus consists of two weighted levers B B forming the arms of the figure Figs. 1 and 2 the upper ends of said levers or shoulders of the figure forming each a segment of a circle and grooved to admit chains or cords L fastened to them and to which the scales K are suspended. The shafts A on which said levers move are made knife edged and inserted obliquely above the centers of the circles of the shoulders, that is of the circles of which the above segment is a part and are placed in the dies Q of the openings D of the figure so that as the scales descend they approach to a perpendicular position in the openings—the said levers or arms of the figures serving as the unchangeable weights by which the weighing is effected—as their extremities or hands rise in the arc of a circle or approach a horizontal position their gravity increases and at the same time the leverage from the periphery of the shoulders to the shafts gradually decrease on account of said shafts not being inserted in the centers of the circles of the shoulders as before stated and consequently a progressive increase of weight must be added to the scales in order to raise the levers which weight may be indicated by means of an index fixed to the center of the circle of the shoulder of one of the levers B and a graduated arch N placed over the figure containing the weighing apparatus over the face of which the point of the index moves to the extent of 90 degrees. But I prefer to have the index to perform a semi-circle and in order to effect this object I fix the index H to a wheel G one half the diameter of another wheel E fixed to one of the arms B around which, and the small wheel G is wound a cord or chain F so that as the arm is raised by adding weight to the scale the large wheel on it is turned to the right a quarter of a revolution and winds up the cord F causing the small wheel also to turn to the right half a revolution at the same time raising the pendulum I, which, when the scales are emptied returns to its former position bringing the index or pointer back to its original position as represented in the drawing.

The scales K are suspended to two chains or cords L L lying in grooves in the curved shoulders of the arms and fastened thereto at the ends and extending down through the legs of the figure C below the base on which the figure stands where the lower ends are united to the scales, being kept parallel in passing through the legs by a bar R placed between the chains which are notched at the ends to admit them. The figure stands upon a platform M under a graduated arch N supported upon two columns O over which graduated arch the index is made to move for indicating the weight in the scales. The arch is secured to the tops of the columns by mortises and tenons so that it can be removed and another put in its place graduated for the kind of weighing required.

The openings D in the shoulder of the supporting figure are made arched on top to prevent the shafts from escaping and bushed with steel dies Q at the bottom or angle for the sharp edges of the shafts to turn in.

The figure is composed of two similarly shaped plates arranged and secured together by horizontal studs so as to leave a space between them to admit the before described parts.

I sometimes make use of a second pendulum and a quarter pulley instead of a whole one on the arm which answers an excellent purpose, as seen at Fig. 4.

What I claim as my invention and which I desire to secure by Letters Patent consists in—

The arrangement of the small wheel G in combination with the chain F and lever weight B for causing the index H to perform a semi-circle on the graduated arch for indicating the weight of the article to be weighed, as before described.

MARTIN ROBBINS.

Witnesses:
SAML. CALVIN,
S. F. HENRY.